United States Patent
Weisenstein et al.

(10) Patent No.: US 10,658,675 B1
(45) Date of Patent: May 19, 2020

(54) FREEZE TAPE CAST METALLIC CURRENT COLLECTORS

(71) Applicant: ZAF ENERGY SYSTEMS, INCORPORATED, Bozeman, MT (US)

(72) Inventors: Adam Weisenstein, Bozeman, MT (US); Allen Charkey, Winter Haven, MT (US); Melissa D. McIntyre, Butte, MT (US)

(73) Assignee: ZAF ENERGY SYSTEMS, INCORPORATED, Bozeman, MT (US)

( * ) Notice: Subject to any disclaimer, the term of this patent is extended or adjusted under 35 U.S.C. 154(b) by 0 days.

(21) Appl. No.: 16/178,321

(22) Filed: Nov. 1, 2018

(51) Int. Cl.
*H01M 4/74* (2006.01)
*H01M 4/88* (2006.01)
*H01M 10/052* (2010.01)
*H01M 4/66* (2006.01)

(52) U.S. Cl.
CPC ............ *H01M 4/74* (2013.01); *H01M 4/661* (2013.01); *H01M 4/8857* (2013.01); *H01M 10/052* (2013.01)

(58) Field of Classification Search
CPC ...... H01M 4/74; H01M 4/661; H01M 4/8857; H01M 10/052; B28B 1/007; B29C 35/15; C04B 38/0605; C04B 35/00; C04B 35/63488; C04B 2235/606
See application file for complete search history.

(56) References Cited

U.S. PATENT DOCUMENTS

2015/0072236 A1* 3/2015 Um .................. C22C 1/0408
429/219
2017/0100857 A1* 4/2017 Bai .................. B29C 39/38

OTHER PUBLICATIONS

David Driscoll et al., Electrical and Flexural Anisotropy in Freeze Tape Cast Stainless Steel Porous Substrates, ScienceDirect, Materials Letters 65 (2011), pp. 3433-3435.
Kristen L. Scott et al., A Review of Processing, Microstructure and Properties via the Open Data Repository, FreezeCasting.net, Progressive Materials Science (2018), 143 pgs.
Francisco Garcia-Moreno, Commercial Applications of Metal Foams: Their Properties and Production', MMPI Materials Journal, 2016, pp. 1-27.
Milad Azami Ghadkolai et al., "Freeze Tape Cast Thick Mo Doped Li4Ti5012 Electrodes for Lithium-Ion Batteries", Journal of the Electrochemical Society, 164 (12), 2017, pp. A2603-A2610.
Benjamin Delattre et al., "Impact of Pore Tortuosity on Electrode Kinetics in Lithium Battery Electrodes: Study in Directionally Freeze-Cast LiNi0.8Co0.15Al0.05O2 (NCA)", Journal of the Electwchernical Society, 165 (2), 2018, pp. A388-A395.

* cited by examiner

*Primary Examiner* — Stephen J Yanchuk
(74) *Attorney, Agent, or Firm* — Brooks Kushman P.C.

(57) ABSTRACT

An electrode includes a current collector having metallic struts formed by freeze tape casting along a cast direction, and an electrochemically active material occupying portions of the void spaces. The struts define a percolated conductive network and void spaces through the percolated conductive network. The struts are directionally aligned and the void spaces are directionally ordered perpendicular to the cast direction.

18 Claims, 2 Drawing Sheets

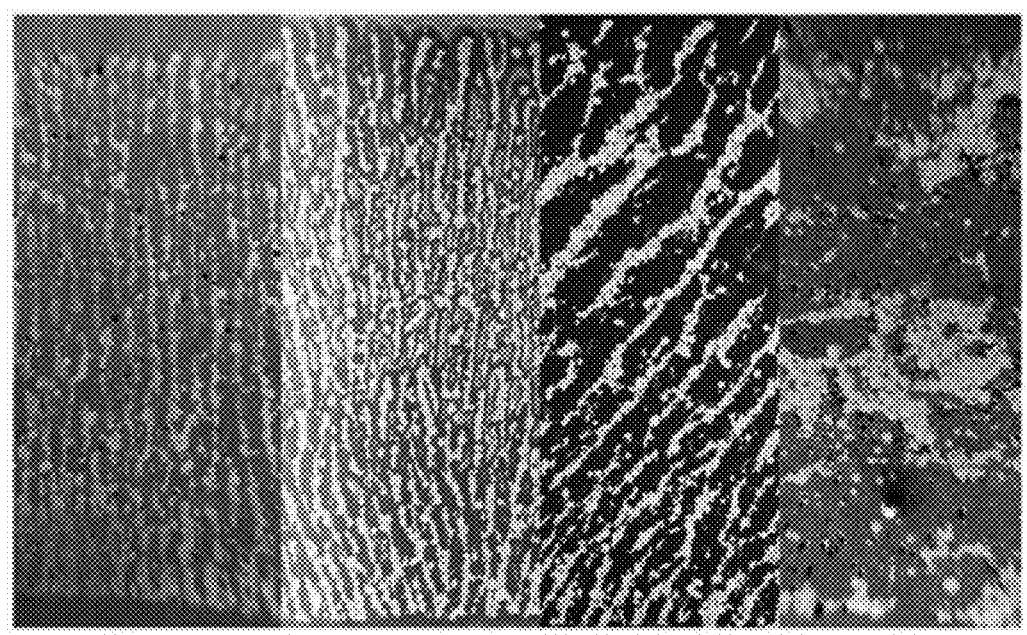
*Fig-4A*  *Fig-4B*  *Fig-4C*  *Fig-4D*
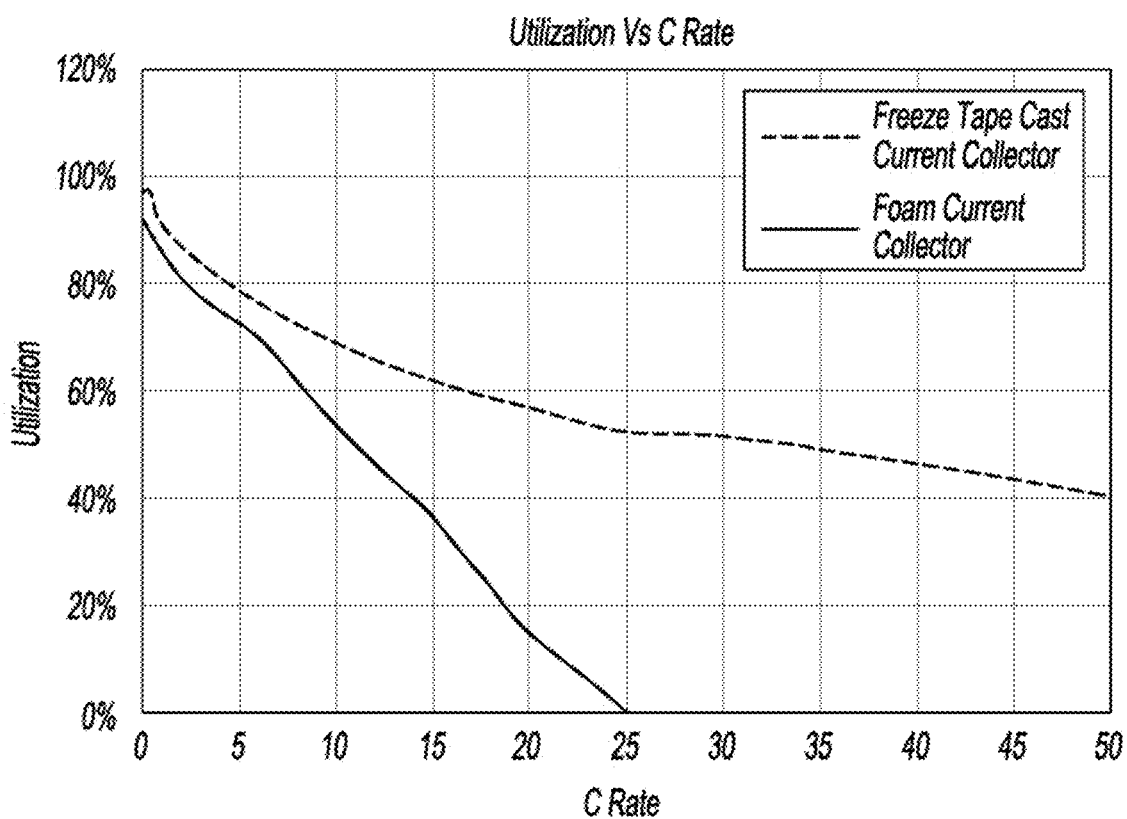
*Fig-5*

US 10,658,675 B1

FREEZE TAPE CAST METALLIC CURRENT COLLECTORS

TECHNICAL FIELD

This disclosure relates to freeze tape cast metallic current collectors for electrochemical devices.

BACKGROUND

Three-dimensional metallic current collectors, such as metal foams, for electrochemical devices provide mechanically robust and high-capacity electrodes. These electrodes also have an established, ordered conductive percolated network within the electrode structure-decreasing electron travel distance through electrochemically active material. Due to the percolated conductive network and mechanical robustness of three-dimensional metallic current collectors, thicker and higher capacity electrodes can be utilized when compared to traditional metallic foil or expanded metal current collectors. While metallic foam allows for thick and high capacity electrodes, the randomized nature of the thin metallic strands and pore structure limits the electronic conductivity and active material utilization of the electrodes especially at high rates of discharge.

SUMMARY

An electrode includes a current collector having metallic struts, formed by freeze tape casting along a cast direction, that define a percolated conductive network and void spaces through the percolated conductive network, and an electrochemically active material occupying portions of the void spaces. The struts are directionally aligned and the void spaces are directionally ordered perpendicular to the cast direction.

A battery has an electrode including a current collector having freeze tape cast metallic struts that define a percolated conductive network and void spaces through the percolated conductive network, and an electrochemically active material occupying portions of the void spaces. The struts are directionally aligned and the void spaces are directionally ordered perpendicular to a cast direction of the struts.

An electrode includes a current collector having active material metallic struts, formed by freeze tape casting along a cast direction, that define a percolated conductive network and void spaces through the percolated conductive network. The struts are directionally aligned and the void spaces are directionally ordered perpendicular to the cast direction.

BRIEF DESCRIPTION OF THE DRAWINGS

FIGS. 4A-4D are cross-sections of microstructure cut at 90°, 50°, 40° and 0° respectively relative to the cast direction.

FIG. 5 is a plot comparing utilization versus C-rate for half-cells with either metallic foam or freeze tape cast metallic current collectors.

DETAILED DESCRIPTION

Figure 1:
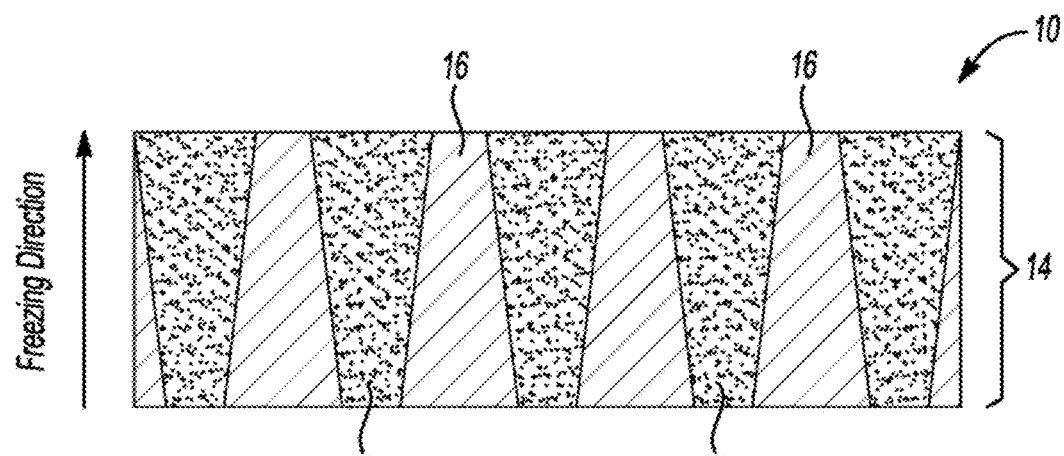
FIG. 1 is a side view, in cross-section, of an electrode containing an active material impregnating a single-sided freeze tape cast metallic current collector wherein the metallic struts each taper from one end to another.

Various embodiments of the present disclosure are described herein. However, the disclosed embodiments are merely exemplary and other embodiments may take various and alternative forms that are not explicitly illustrated or described. The figures are not necessarily to scale; some features may be exaggerated or minimized to show details of particular components. Therefore, specific structural and functional details disclosed herein are not to be interpreted as limiting, but merely as a representative basis for teaching one of ordinary skill in the art to variously employ the present invention. As those of ordinary skill in the art will understand, various features illustrated and described with reference to any one of the figures may be combined with features illustrated in one or more other figures to produce embodiments that are not explicitly illustrated or described. The combinations of features illustrated provide representative embodiments for typical applications. However, various combinations and modifications of the features consistent with the teachings of this disclosure may be desired for particular applications or implementations.

Freeze-casting is a solidification technique for fabricating porous materials. During solidification, walls are templated due to rejection of particles and/or solute by a solidifying fluid. Pore structures created after post-solidification solid removal replicate the morphology of the solidified fluid. The number and diversity of potential freeze casting applications is considerable and include substrates for supercapacitors, photocatalysis, liquid chromatography, sensors (e.g. pressure, biological and gas), and batteries. Thus far, ceramic/metal, ceramic/polymer, metal/polymer, and metal/metal composites have been demonstrated.

Large metallic porous substrates with graded columnar pores, producing directionally aligned metallic struts that can span the entire cast tape, have been achieved through the freeze tape casting process. The freeze tape casting process is like the freeze casting process as a suspension is drawn onto a freeze bed, where the solvent (water) begins to solidify and ice crystals nucleate between the suspension and freeze bed. The ice grows upwards and displaces other particles within the suspension. The ice is sublimed from the cast tape by lyophilization and results in a scaffold containing porosity that matches the size and shape of the ice crystals. Freeze tape casting diverges from the traditional freeze casting method in that the suspension is drawn through a doctor blade, which determines the height of the cast, and by matching the speed of the ice crystal growth with that of the tape carrier speed, a uniform solidification front can be achieved. This results in directionally aligned metallic struts spanning the width of the cast. Unlike traditional freeze casting in which freeze cast domains and grain boundaries in the bulk cast material limit pore ordering to several hundred microns, the freeze tape casting process forms a single freeze cast domain that extends to the macro scale. This ordered freeze cast domain permits bulk materials to be fabricated with intrinsic anisotropy structures specifically tailored for desired applications.

Powder metallurgy-based freeze tape casting presents a unique opportunity to engineer pore structures in metals for catalyst support and energy conversion devices. While traditional freeze casting has been employed with titanium, the process of freezing in dies and molds limits pore ordering to several hundred microns due to the formation of freeze cast domains which is synonymous with grain boundaries on a macro scale. The application of freeze tape casting to metallic materials, for which a single freeze cast domain can be fabricated, allows for intrinsic anisotropy of these bulk materials to be tailored. This process provides the prospect to engineer anisotropy in not only the porosity, but also the flexural and electrical properties in a single process through a bulk metal tape.

Quantitatively, freeze-cast microstructures are most commonly described in terms of total porosity, structure wavelength, and pore and wall sizes. Structure wavelength is defined as the average sum of the width of one pore plus its adjacent wall. This parameter, traditionally used to describe primary dendrite spacing in metal alloys, only applies to anisotropic freeze-cast materials and is most commonly used to describe lamellar structures. For anisotropic microstructures, pore and wall size is typically described in terms of width (the length of the minor axis), whereas for isotropic structures, diameter is used.

Metallic current collectors fabricated with the freeze tape casting method produce directionally aligned metallic struts that define a percolated conductive network and ordered void spaces through the percolated conductive network. The freeze tape cast metallic current collector provides the same benefits of a three-dimensional metallic foam; however, the structure does not have the drawbacks of electronic tortuosity associated with the randomized thin metallic strands and void spaces in metal foams. The aligned metallic struts of the freeze tape cast current collector reduce electronic tortuosity resulting in a significant increase in conductivity as well as creating a more uniform distribution of active material, which promotes more efficient utilization of the electrode structure. This design enables electrodes to be capable of high power and capacity not before achievable with existing random foam type metallic electrodes.

Figure 2:
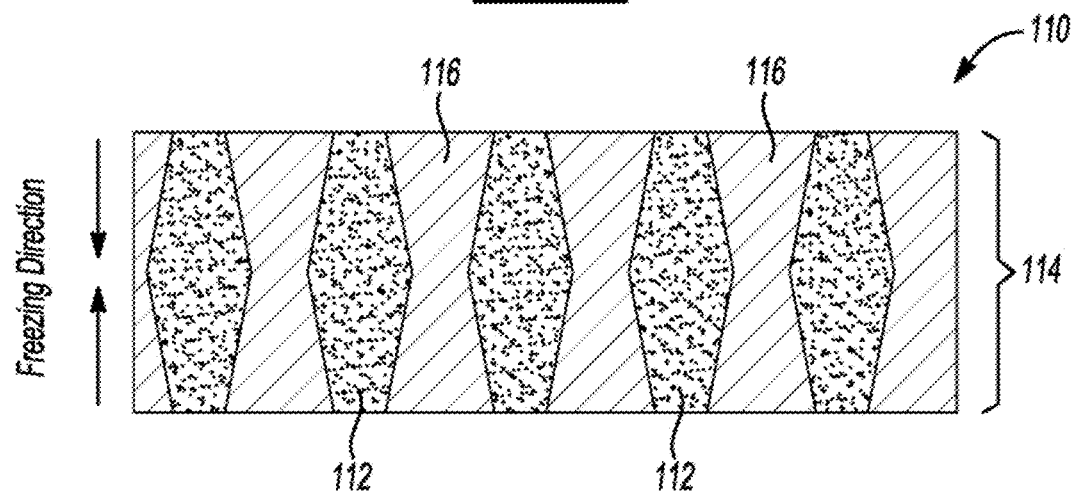
FIG. 2 is a side view, in cross-section, of an electrode containing an active material impregnating a dual sided freeze tape cast metallic current collector wherein the metallic struts each taper from opposite ends toward a middle thereof.
Figure 3:
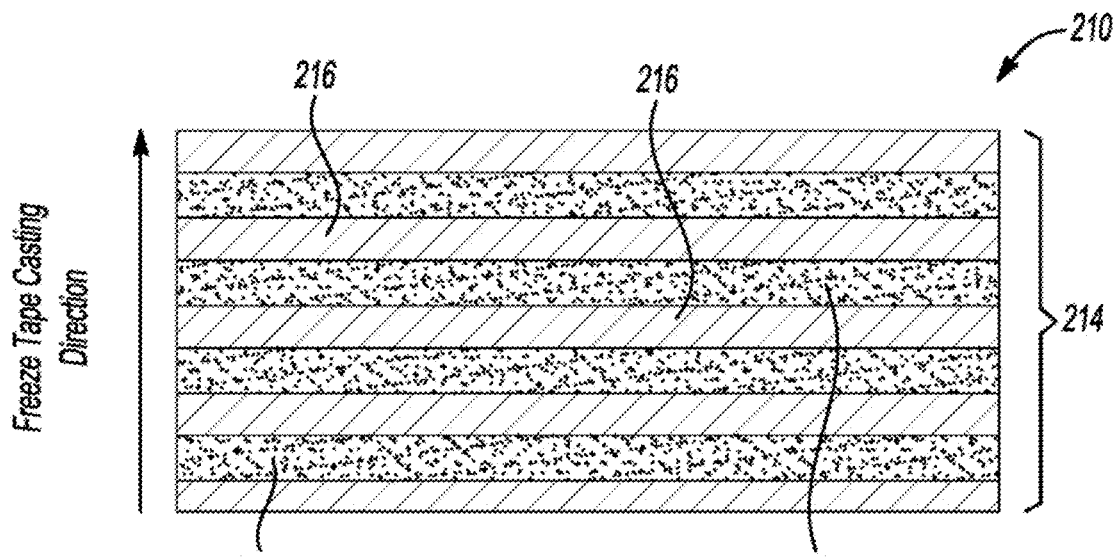
FIG. 3 is top view of an electrode containing an active material impregnating a freeze tape cast metallic current collector wherein the metallic struts are parallel to each other.

An electrode containing a freeze tape cast metallic current collector was developed to provide a three-dimensional electrode capable of higher power and capacity over previously utilized current collectors, such as foams, expanded metals, and foils. FIG. 1 is a side view of an electrode 10, according to the present disclosure, including an active material 12 impregnating a single sided freeze tape cast metallic current collector 14 defining directionally aligned metallic struts 16 that each taper from one end to another. FIG. 2 is a side view of an electrode 110, according to the present disclosure, including an active material 112 impregnating a dual sided freeze tape cast metallic current collector 114 defining directionally aligned metallic struts 116 that each taper from opposite ends toward a middle thereof. FIG. 3 is a top view of an electrode 210, according to the present disclosure, including an active material 212 impregnating a freeze tape cast metallic current collector 214 defining metallic struts 216.

The struts may be plated with, for example, a metallic element. Also, the struts may be aluminum, copper, gold, iron, lead, nickel, silver, stainless steel, titanium, or zinc. The active material may form an anode, cathode, or catalyst. If the active material forms an anode, it may be metals, metal hydroxides, metal hydrides, metal oxides or combinations thereof. Examples of anode active materials include aluminum, cadmium, iron, lead, lithium, lithium titanate, magnesium, sodium, zinc, or zinc oxide. If the active material forms a cathode, it may be catalyzed oxygen, metal oxides, metal hydroxides, metal phosphates, or sulfur complexes. Examples of cathode active materials include iron sulfur, lead dioxide, lithium cobalt oxide, lithium iron phosphate, lithium manganese oxide, lithium nickel manganese cobalt oxide, lithium nickel cobalt aluminum oxide, manganese dioxide, mercury oxide, nickel hydroxide, silver oxide, or sulfur.

Examination of microstructure as shown in FIGS. 4A through 4D illustrate the anisotropy of the pores that gives rise to variations observed in physical properties. Cross-sections viewed in the direction of casting show a highly ordered pattern of alternating solids and porosity (percolated conductive network and void spaces) arranged in vertical columns propagating throughout the thickness of the sample. The images indicate that the pore walls are observed as closely packed columns or "struts," where the struts are only loosely connected in the direction of casting, but highly interconnected perpendicular to that direction. In this manner, only the thin cross-section of the pore wall, or strut, can be seen at 90° but the surface of the pore wall in addition to small portions of the strut can be observed at 0°. The observed skewing from vertical indicated at 40° is due to the bottom of the tape freezing prior to the top of the tape while the tape was in motion, which provides yet another mechanism for tailoring the porosity in terms of pore tilting. The areas seen in the cross-sectional image at 0° can be further explained as sections of overlapping struts, hence observation of pore wall surfaces, that are truncated when cross-sectioned as a result of not being entirely vertical when viewed at 0°.

The images taken at 90° and 50° show little variation due to the two-dimensional view into the direction of pore volume, resulting in multiple struts being observed as one vertical strut given the limited depth of field in the cross sections. However, after the 45° threshold has been crossed, as in the image at 40°, the solids observed are individual struts, enabling the tilt of the pores to be seen in the two-dimensional image. It was also observed that the apparent solids-loading decreased in the two-dimensional images from approximately 33% at 90° to approximately 25% at 40°. This apparent decrease in the volume fraction of metal is synonymous with a decreasing conductor cross-section and supports the observation of lower rigidity in directions diverging from that of casting. In addition to a smaller effective cross-sectional area, decreased apparent solids-loading implies a decrease in interconnectivity of metal phase. This decreased interconnectivity increases electron path length coupled with reduced rigidity.

Half-cell tests were performed with both foam and freeze tape cast metallic current collectors impregnated with a nickel hydroxide active material. The half-cells contained a zinc reference and a nickel foam gassing counter electrode and were bathed in an electrolyte consisting primarily of potassium hydroxide and water. The half-cells were completely formed and then tested at multiple discharge C-rates, ranging from C/6 to 50 C. After each discharge, the cells were fully charged and given a rest of 15 minutes at open circuit potential between charges and discharges. As shown in FIG. 5, the electrode utilizing the freeze tape cast current collector vastly outperformed the traditional foam electrode. The freeze tape cast current collector outperformed the foam electrode at every tested C-rate and had utilization gains of 28.7% at a 10 C rate and 284.5% at a 20 rate.

While exemplary embodiments are described above, it is not intended that these embodiments describe all possible forms encompassed by the claims. For example with reference to FIGS. 1-3, the struts 16, 116, 216 of the current collectors 14, 114, 214 may be formed from active material such as aluminum, cadmium, iron, lead, lithium, nickel, platinum, silver, or zinc. In these arrangements, active material would not fill the gaps between the struts 16, 116, 216. Rather, electrolyte may occupy such space. Other arrangements are also possible.

The words used in the specification are words of description rather than limitation, and it is understood that various changes may be made without departing from the spirit and scope of the disclosure and claims. As previously described, the features of various embodiments may be combined to form further embodiments that may not be explicitly described or illustrated. While various embodiments may have been described as providing advantages or being preferred over other embodiments or prior art implementations with respect to one or more desired characteristics, those of ordinary skill in the art recognize that one or more features or characteristics may be compromised to achieve desired overall system attributes, which depend on the specific application and implementation. These attributes include, but are not limited to appearance, cost, durability, ease of assembly, life cycle cost, manufacturability, marketability, packaging, serviceability, size, strength, weight, etc. As such, embodiments described as less desirable than other embodiments or prior art implementations with respect to one or more characteristics are not outside the scope of the disclosure and may be desirable for particular applications.

What is claimed is:

1. An electrode comprising:
    a current collector having metallic struts, formed by dual sided freeze tape casting along a cast direction, that define a percolated conductive network and void spaces through the percolated conductive network, the struts spanning and being directionally aligned along an entire width of the current collector, the void spaces being directionally ordered perpendicular to the cast direction, and each of the struts tapering from opposite ends toward a middle thereof; and
    an electrochemically active material occupying portions of the void spaces.

2. The electrode of claim 1, wherein the struts are parallel to each other.

3. The electrode of claim 1, wherein the struts are plated.

4. The electrode of claim 1, wherein the struts include aluminum, copper, gold, iron, lead, nickel, silver, stainless steel, titanium, or zinc.

5. The electrode of claim 1, wherein the active material forms an anode, cathode, or catalyst.

6. The electrode of claim 5, wherein the active material of the anode is metal, metal hydroxide, metal hydride, metal oxide or combinations thereof.

7. The electrode of claim 5, wherein the active material of the cathode is catalyzed oxygen, metal oxides, metal hydroxides, metal phosphates, or sulfur complexes.

8. A battery comprising:
    an electrode including a current collector having freeze tape cast metallic struts that define a percolated conductive network and void spaces through the percolated conductive network, the struts spanning and being directionally aligned along an entire length of the current collector, the void spaces being directionally ordered perpendicular to a cast direction of the struts, and each of the struts tapering from opposite ends toward a middle thereof; and
    an electrochemically active material occupying portions of the void spaces.

9. The battery of claim 8, wherein the struts are parallel to each other.

10. The battery of claim 8, wherein the struts are plated.

11. The battery of claim 8, wherein the struts include aluminum, copper, gold, iron, lead, nickel, silver, stainless steel, titanium, or zinc.

12. The battery of claim 8, wherein the active material forms an anode, cathode, or catalyst.

13. The battery of claim 12, wherein the active material of the anode is metal, metal hydroxide, metal hydride, metal oxide or combinations thereof.

14. The battery of claim 12, wherein the active material of the cathode is catalyzed oxygen, metal oxides, metal hydroxides, metal phosphates, or sulfur complexes.

15. An electrode comprising:
    a current collector having active material metallic struts, formed by dual sided freeze tape casting along a cast direction, that define a percolated conductive network and void spaces through the percolated conductive network, the struts spanning and being directionally aligned along an entire width or length of the current collector, the void spaces being directionally ordered perpendicular to the cast direction, and each of the struts tapering from opposite ends toward a middle thereof.

16. The electrode of claim 15, wherein the struts include aluminum, cadmium, iron, lead, lithium, nickel, platinum, silver, or zinc.

17. The electrode of claim 15, wherein the struts are parallel to each other.

18. The electrode of claim 15, wherein the struts are plated.

* * * * *